United States Patent
Stava

(10) Patent No.: US 6,365,864 B1
(45) Date of Patent: Apr. 2, 2002

(54) CLEANING DEVICE FOR WELDING WIRE AND METHOD OF CLEANING WELDING WIRE

(75) Inventor: Elliott K. Stava, Sagamore Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/558,644

(22) Filed: Apr. 26, 2000

(51) Int. Cl.⁷ .............................................. B23K 9/067
(52) U.S. Cl. ...................... 219/50; 219/155; 219/605; 219/145.22
(58) Field of Search ............................. 219/155, 145.1, 219/145.22, 146.3, 146.31, 73, 74, 605; 29/81.13

(56) References Cited

U.S. PATENT DOCUMENTS

| | | | | |
|---|---|---|---|---|
| 1,629,748 A | * | 5/1927 | Stoody | 219/145.22 |
| 2,405,673 A | * | 8/1946 | Scherl | 219/73 |
| 2,836,701 A | * | 5/1958 | Bernard | 219/74 |
| 3,146,336 A | * | 8/1964 | Whitacre | 219/155 |
| 3,430,031 A | * | 2/1969 | Sunnen | 219/146.3 |
| 3,499,804 A | * | 3/1970 | Clarke | 219/155 |
| 4,721,837 A | * | 1/1988 | Gamberg | 219/146.31 |
| 5,481,788 A | * | 1/1996 | Simon et al. | 29/81.13 |
| 5,821,500 A | * | 10/1998 | Araki et al. | 219/155 |
| 5,981,904 A | * | 11/1999 | Gordon | 219/155 |

\* cited by examiner

Primary Examiner—Clifford C. Shaw
(74) Attorney, Agent, or Firm—Vickers, Daniels & Young

(57) ABSTRACT

A wire cleaner for removing impurities from the surface of an elongated welding wire as the wire travels along a given path, the wire cleaner comprises a tunnel with a tube having a central passage surrounding the path with a gap between the tube and the wire moving through the tube, a power supply with first and second output terminals across which is generated an AC output current having a frequency in the range of about 100–300 kHz and a magnitude of at least about 1.0 amperes, a first connector attaching the first output terminal to the tube and a second terminal attaching the second output terminal to the moving wire whereby current proportional to the output current flows along the surface and across the gap to heat the wire to cause evaporation of the surface impurities. As an alternative, induction heating of the wire is used.

59 Claims, 4 Drawing Sheets

CLEANING DEVICE FOR WELDING WIRE AND METHOD OF CLEANING WELDING WIRE

INCORPORATION BY REFERENCE

The preferred embodiment of the invention relates to cleaning a rapidly moving electrode after it has been drawn to the desired size to remove impurities accumulated on the outer surface of the welding wire. The preferred embodiment of the invention is directed to cleaning a cored electrode which is a standard wire in the electric arc welding field. Such welding wire includes an interior core formed from particles, such as flux particles and alloy particles, around which a steel sheath is wrapped. The cored wire is drawn through a die into the desired size. This technology is well developed and is illustrated in Stoody U.S. Pat. No. 1,629,748. This patent is incorporated by reference to show cored wire of the type being cleaned in accordance with the preferred embodiment of the present invention. The invention can be used for cleaning solid welding wire. Stoody U.S. Pat. No. 1,629,748 discloses the formation of a cored wire or electrode; however, it does not illustrate the drawing die for reducing the size of the wire. The drawing process compacts the internal particles into a tight mass. This process causes impurities to accumulate on the surface, and also results in materials, such as trapped gas and impurities, migrating from the core to the outer surface of the wire. Use of a drawing die in making cored electrodes is disclosed in Gamberg U.S. Pat. No. 4,721,837, which is incorporated by reference herein as general background so the technology for making the cored electrode need not be repeated.

This application relates to the art of manufacturing electric arc welding wire and more particularly to a cleaning device for cleaning the wire after it has been drawn to the desired size.

In making solid welding wire, the outer surface of the wire also becomes contaminated with certain impurities, such as drawing compound. It has been suggested that solid wire can be cleaned by cathode cleaning using a magnetic field to rotate the arc as the electrode is progressing through a chamber or tunnel. This technique is quite complicated and expensive. It results in surface areas that are not clean. The arc is created by a voltage of 2–20 volts in a chamber filled with an inert atmosphere. A cathodic cleaning device for solid electrode wire is disclosed is Gordon U.S. Pat. No. 5,981,904. This patent is incorporated by reference herein as background information.

BACKGROUND

The present invention relates to cleaning the surface of a drawn cored electrode or welding wire, and it will be described with reference to a cored electrode; however, the invention has much broader applications and can be used for a solid welding wire, such as illustrated in Gordon U.S. Pat. No. 5,981,904. Both cored electrodes and solid welding wire are drawn to size. The drawing process is performed with a drawing compound or lubricant that accumulates on the outer surface and must be removed to prevent certain inconsistencies in the electric arc welding process performed using the welding wire. Attempts to accomplish this cleaning operation, other than those attempts illustrated in the material incorporated by reference, involve passing the wire through a plasma column. Such technique is inconsistent and is not easily incorporated into a wire manufacturing facility. Where the welding wire has been cleaned subsequent to drawing, there has been inconsistent results. Some areas of the surface of the wire were not cleaned. In addition, cleaning was expensive, slow, and required complex equipment.

The present invention overcomes disadvantages experiences in prior efforts to clean impurities from the surface of a rapidly moving welding wire, cored or solid, preparatory to it being wrapped on a spool or coiled into a transport drum. These advantages are accomplished by the cleaning device and method of cleaning welding wire constituting the present invention.

THE INVENTION

In accordance with the present invention, there is provided a wire cleaner for removing impurities from the surface of elongated welding wire, preferably a cored wire, as the wire travels along a given path. This welding wire cleaning device comprises a tunnel with a tube having a central passage surrounding the path and defining a gap between the tube and the wire moving through the tube. A power supply such as a Resonant Arc Starter by The Lincoln Electric Company is provided with first and second output terminals across which is generated an AC output current. In accordance with the invention, the current has a frequency in the range of 100–300 kHz with a magnitude of at least about 1.0 amperes. By using this power supply, the heating effect is concentrated on the outer skin of the wire. The heating of the sheath penetrates to a reference depth that is quite shallow. In the novel cleaner, a first connecter attaches the first output terminal of a power supply to the tube and the second terminal of the power supply to the moving wire by a sliding contact. Thus, the high frequency current passes through the wire along the surface of the sheath between the contact and the location of the arc in the plasma gap between the tunnel and the welding wire. This plasma arc moves along the surface and, from time to time, the polarity changes. Consequently, heating is primarily by current passing through the outer skin of the sheath. A high temperature plasma is created in the wire surrounding the gap by the arc across the gap. This plasma gap is in the general range of 0.025–0.030. Since the gap is quite small, heating is by resistance heating as current passes along the wire to the point of arcing and by conduction from the hot gases created by the arc in the small gap. In this manner, a current proportional to the output current of the power supply flows along the surface of the sheath and across the gap to heat the wire as the wire moves through the tube. This heating procedure has proved successful in removing surface impurities caused by the drawing operation or caused by leakage of core material to the exterior of a wire.

In accordance with another aspect of the invention, the novel cleaning device has an inlet for inert gas, such as argon. This gas fills the gap between the wire and the tube to prevent oxidation of the surface during the cleaning operation. To introduce the high frequency into the surface of the moving wire, each end of the tube is provided with a ring providing a sliding contact with the advancing welding wire.

In accordance with another aspect of the invention, two or more tandem located cleaning devices are used to clean the wire as it is moving along a path. In this manner, progressive surface cleaning of the wire is accomplished to assure a nascent, cleaned outer surface, which condition assures good electrical contact with the welding wire.

By using a frequency in the range of about 100–300 kHz, only the surface or skin of the advancing wire is penetrated by the currents flowing along the welding wire. This localizes the heating at the very thin outer layer of the wire to cause no metallurgical changes in the sheath being cleaned.

In accordance with another aspect of the invention, the welding wire enters the cleaning device with the sheath at an elevated temperature. The elevated temperature can be caused by the friction in the drawing die located upstream of the cleaning device.

In accordance with still another aspect of the invention, after the drawing process, the wire passes through an annealing station, where it is annealed either by resistance heating or induction heating. This causes a soft, but hot, sheath entering the cleaning device. The elevated temperature of the sheath gives a warm metal portion under the heated skin during the cleaning operation. Consequently, by using high frequency so that the reference depth is very shallow, the outer surface of the wire can be rapidly heated to a high temperature. When the wire enters the cleaning station at a low temperature, i.e. room temperature, high frequency shallow surface cleaning action is not as effective. As the high frequency current passes along the surface of the wire, the surface temperature increases rapidly. However, due to the heatsink effect of a cold sheath, the heated outer surface rapidly cools. Cleaning of impurities from the surface requires both high temperature and a protracted time at such high temperature to accomplish the desired amount of evaporation. When a cold sheath enters the cleaning device, the cold sheath quenches the heated surface and distracts from the evaporative effect of the cleaning operation. Consequently, as an aspect of the invention, the sheath or outer portion of the wire entering the cleaning device is at an elevated temperature. The elevated temperature can be accomplished by an annealing process or by the normal friction heating created by the drawing die. To use the heating of the drawing die, the cleaning device must be closely adjacent the drawing die.

In accordance with the preferred embodiment of the invention, the high frequency heating effect is by combined resistance heating and plasma heating caused by arcs between the tube and the advancing wire in the tube. In an alternative embodiment, an induction heating coil is positioned around the moving wire. Thus, the tunnel of the cleaning device is the central passage of the induction heating coil. This coil is energized with an alternating current having a frequency in the general range of 100–300 kHz and with a current at least about 1.0 amperes. An induction heating coil is also used for annealing before the cleaning step. By using high frequency, skin effect provides a very shallow reference depth. In this embodiment, the total heating of the surface is by induction heating. In the preferred embodiment, the heating is partially resistance heating and partially plasma heating.

The method of removing impurities from the surface of an elongated welding wire using the cleaning device defined above is another aspect of the invention. As the wire travels along a given path, it is initially heated at a first location on the path to a first depth. This initial heating can be by induction heating or by resistance heating. In both instances, the outer sheath or outer portion of the wire is at an elevated temperature. Thereafter, there is subsequent a cleaning operation wherein the surface of the wire is heated at a second location. This subsequent heating is to a second depth in the sheath, which second depth is less than the first depth. Consequently, the wire is heated to a fairly deep level before entering the cleaning operation. This gives a heat barrier or reservoir for the cleaning operation. Then, high frequency cleaning creates a hot outer surface. The hot surface is not immediately quenched by a cold core. The preferred embodiment involves heating and cleaning a cored electrode. However, a drawn solid electrode wire is equally capable of being processed by using the present invention.

A chamber around the induction heating coils can be evacuated by a pump to reduce the partial pressure around the heated surface. This increases the evaporation efficiency.

The primary object of the present invention is the provision of a device or method for cleaning a rapidly moving welding wire to remove impurities on the wire, which device and method is effective and does not require cathode heating or magnetic control of the heating operation as in the prior art.

Another object of the present invention is the provision of a device and method, as defined above, which device and method can be used at a standard welding wire manufacturing facility to clean impurities from the wire before it is packaged in a spool or coiled in a drum.

These and other objects and advantages will become apparent from the following description taken together with the accompanying drawings.

PREFERRED EMBODIMENT

Figure 1:
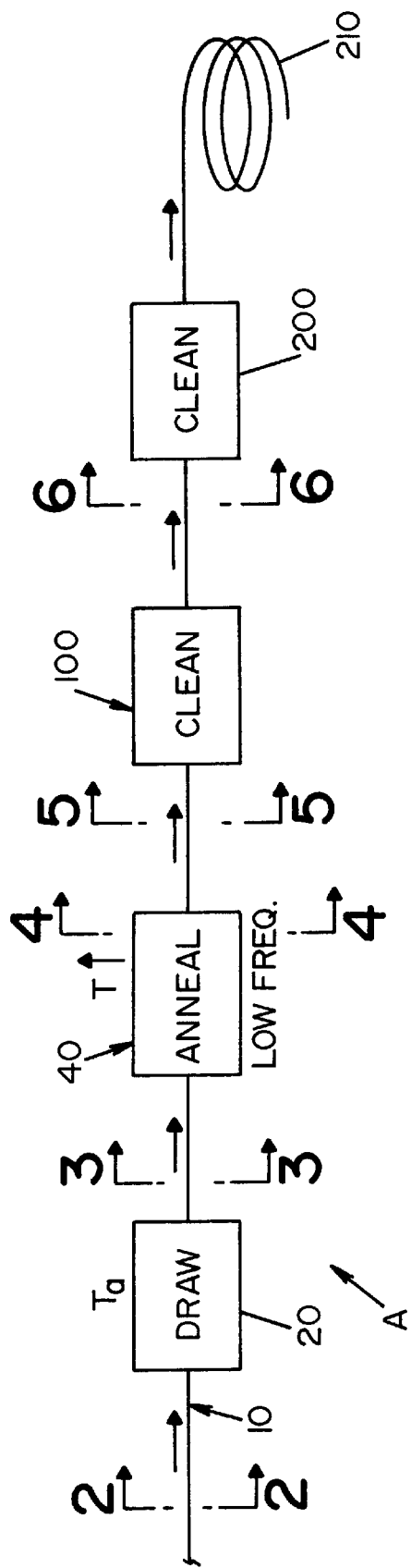
FIG. 1 is a blocked diagram illustrating a welding wire manufacturing operation incorporating the preferred embodiment of the present invention.
Figure 2:
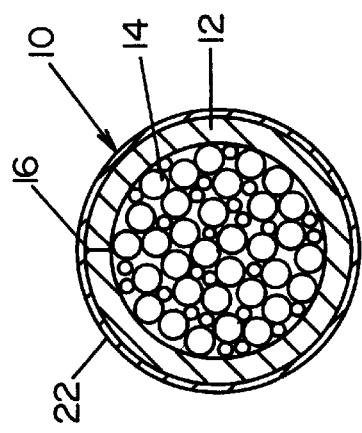
FIG. 2 is an enlarged cross-sectional view taken generally along line 2—2 of FIG. 1.
Figure 3:
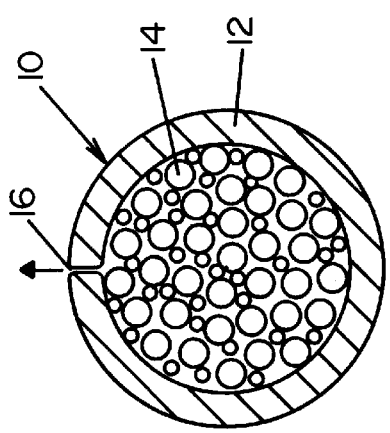
FIG. 3 is an enlarged cross-sectional view taken generally along line 3—3 of FIG. 1.
Figure 4:
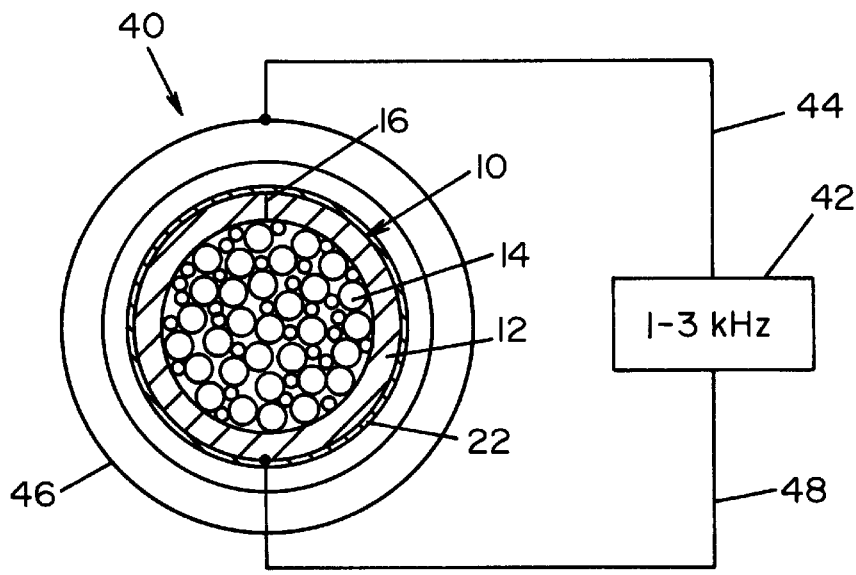
FIG. 4 is an enlarged cross-sectional view taken generally along line 4—4 of FIG. 1 showing a low frequency power supply for annealing the advancing wire.
Figure 5:
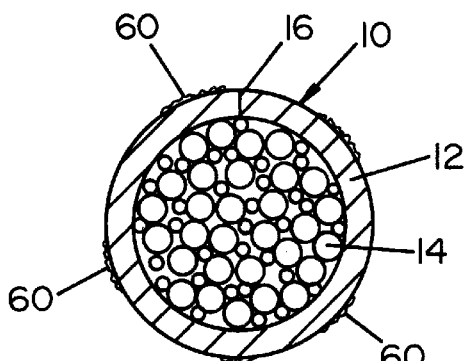
FIG. 5 is an enlarged cross-sectional view taken generally along line 5—5 of FIG. 1.
Figure 6:
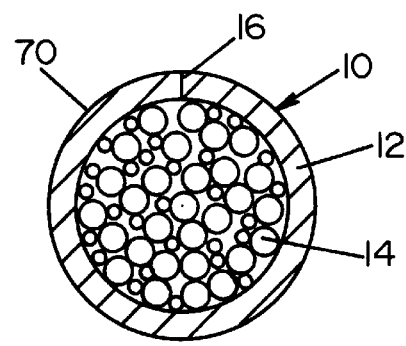
FIG. 6 is an enlarged cross-sectional view taken generally along line 6—6 of FIG. 1.
Figure 7:
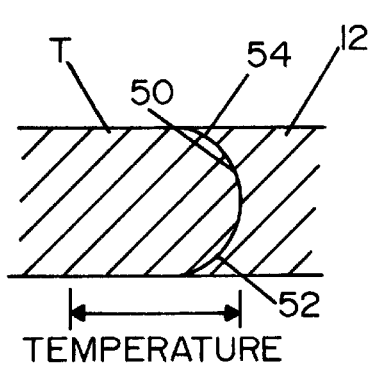
FIG. 7 is an enlarged view showing the outer portion or sheath of the welding wire being cleaned in accordance with the procedure set forth in FIG. 1, illustrating the temperature gradient through the sheath as it enters the cleaning device.

Referring now to the drawings, wherein the showings are for the purpose of illustrating a preferred embodiment of the invention only and not for the purpose of limiting the same, FIG. 1 schematically illustrates a welding wire manufacturing line A for manufacturing a welding wire 10 having an outer sheath 12 and an inner core 14 filled with particles, such as flux and alloy particles, together with a small amount of entrapped gases. The processing of wire 10 includes formation of a surface joint 16, which is illustrated as a butt joint; however, in practice it is normally an overlap joint. Wire 10 as illustrated in FIG. 2 is formed in accordance with standard practice with a small amount of impurities protruding from joint 16. As the wire moves along the manufacturing line, it moves through drawing die 20 where the wire is drawn to the desired size. Two or more drawing dies may be needed to reduce the incoming welding wire to the desired final size. This drawing operation elevates the temperature of the sheath 12 by friction heating during the drawing operation. The elevated temperature of the sheath is represented as temperature $T_a$. At the same time, a drawing compound 22, as shown in FIG. 3, is applied to the outer surface of wire 10. The compound presents a substantial amount of impurities that must be removed before the wire can be used in a welding operation. In accordance with a secondary aspect of the invention, an annealing station 40 shown in FIG. 4 is used to raise the temperature of sheath 12 to an annealing temperature, after which the sheath slowly cools for annealing the steel. The annealing temperature is imparted to sheath 12 by power supply 42 having a low audio frequency of 1–3 kHz. A lead 44 is connected to a tube 46 of the annealing station. Lead 48 is connected to sheath 12. As illustrated in FIG. 7, the annealing process creates an internal heat profile 50 through sheath 12. The outer surface is at temperature T. The heat profile is cooler at inside portion 52 and cooler at outside portion 54. After the sheath has been heated, the outer surface decreases in temperature by convection, and the internal portion of sheath 12 is cooled by conduction. Thus, heat profile 50 illustrated in FIG. 7 is the heat condition of sheath 12 after the annealing operation. This cooling is by air at a low rate so sheath 12 is annealed. Wire 10 with annealed sheath 12 is shown in FIG. 5. Impurities, such as drawing compound 22, are evaporated to produce a certain amount of residue 60 on the outer surface of the advancing welding wire. This advancing welding wire enters into a cleaning device 100 constructed in accordance with the present invention. In this cleaning device, outer surface 70 is heated to evaporate residue 60 shown in FIG. 5 to produce a clean surface 70, as shown in FIG. 6.

Figure 8:
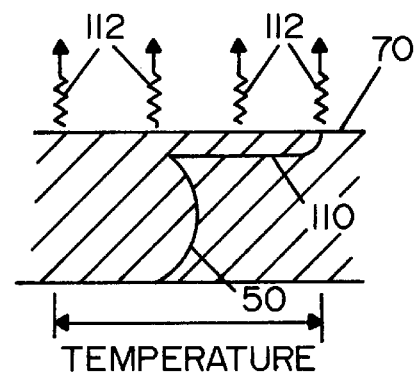
FIG. 8 is a view similar to FIG. 7 illustrating the shallow heating pattern superimposed upon the incoming temperature gradient when cleaning the outer surface of the wire by using the present invention.

In accordance with the invention, heating of the outer surface 70 in cleaning device 100 produces an overlapping heat profile 110, as shown in FIG. 8. Profile 50 remains so the inner portion of sheath 12 remains at an elevated temperature. High frequency used in cleaning device 100 creates a reference depth that is quite small. This provides a high temperature in only the skin of outer surface 70. This allows the temperature of the outer layer to be drastically increased over the heat profile 50, as illustrated by surface temperature profile 110. Profile 50 prevents mass quenching that would cause a rapid reduction of the temperature of the outer surface. By having a warm or relatively hot inner portion of sheath 12, the outside surface or skin, when subject to high frequency, increases rapidly to a temperature to boil off any surface impurities. Without a heated core, the outer surface could not be raised rapidly to a high temperature to evaporate impurities from the surface 70. Such high temperature would be quenched by the mass of the sheath. This would cause surface hardening, if the surface were heated above the austenitic temperature. A hot core prevents mass quenching. The cleaning effect in device 100 demands a high surface temperature that must be held for a length of time. Evaporation is a phenomena controlled by both high temperature and time. If the core were to be cold or room temperature, the surface 70 could be heated rapidly, but it would immediately cool to prevent insufficient time to evaporate impurities to clean surface 70. By using a frequency of 1–3 kHz for power supply 42 in the annealing station, the reference depth for this annealing process is substantially greater than the reference depth for the cleaning process. This facilitates rapid and maintainable surface temperature during the cleaning operation.

Figure 9:
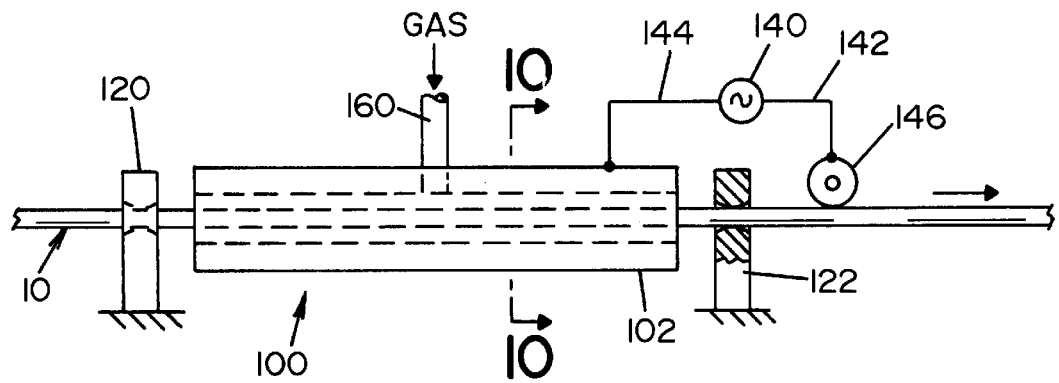
FIG. 9 is a side elevational view showing the cleaning device used in the manufacturing process shown in FIG. 1.
Figure 10:
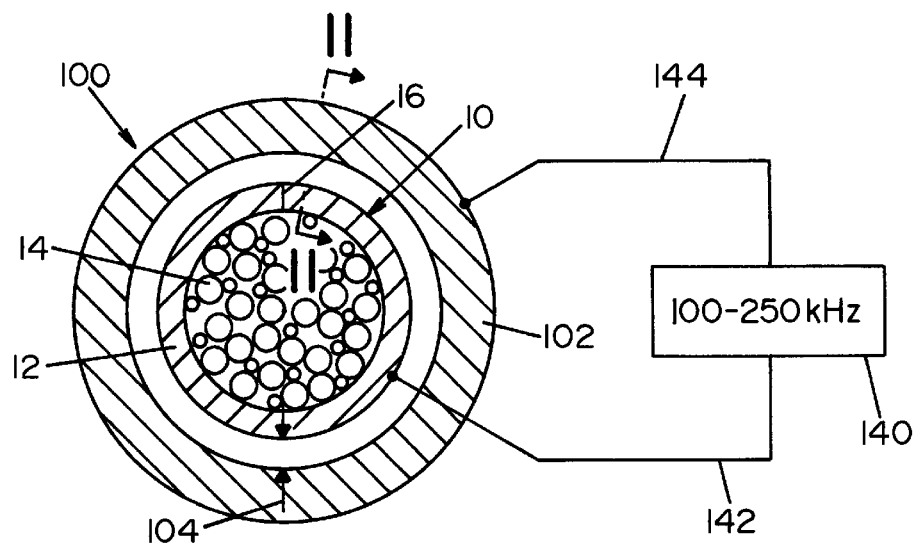
FIG. 10 is an enlarged cross-sectional view taken generally along line 10—10 of FIG. 9.
Figure 11:
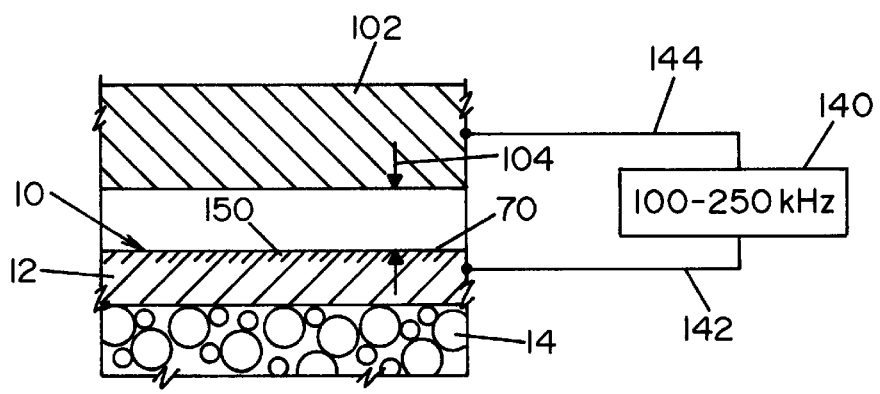
FIG. 11 is a partial cross-sectional side view taken generally along line 11—11 of FIG. 10.

Referring now to FIGS. 9–11, details of cleaning device 100 are illustrated. A tube or tunnel 102 includes outboard rings 120, 122 which are at the input and exit ends of tube 102. Wire 100 passing through tunnel 102 defines a plasma gap 104 across which the heating current passes. To perform this heating operation, power supply 140 has an output current with a frequency in the general range of 100–250 kHz, which is substantially greater than the low frequency 1–3 kHz of the annealing process. Consequently, due to the difference in the frequency, the depth of heating is substantially different from annealing to cleaning. This heating difference provides the overlapping heating profiles shown in FIG. 8. Power supply 140 has a first lead or terminal 142 connected to sheath 12 by sliding contact 146. A second lead or terminal 144 is connected to tube 102. High frequency applied between the tube and sheath and arcs are created across gap 104. This gap is small, in the range of 0.025–0.030. During each alternation of current, the current reverses in the arc so that the primary heating is by a high frequency resistance heating along the length of wire 10 between the contacts and the breakdown arc. Partial resistance heating is supplemented by plasma heating in gap 104. The plasma is caused by arcing. Consequently, heating in tunnel 100 is by resistance, which is a multiple of the square of the current times the resistance of the surface through which the current passes. In accordance with the invention, the current is greater than 1.0 amperes. This current flows near the surface of sheath 12. High frequency causes such skin effect. To complete the circuit, there are arcs in gap 104. Such arcs create a plasma gap 104. Heat by the plasma adds to the resistance heating at surface 70 to raise the surface temperature to the high level of profile 110. When this occurs, the surface is hot and the impurities are evaporated, as indicated by the wavy arrows 112 in FIG. 8. As shown in FIG. 11, this heating is to a very shallow depth 150. In practice, inert gas is introduced into tube or tunnel 102, as indicated by gas inlet 160 in FIG. 9. This gas exits outwardly from tube 102 so that it occupies gap 104 to create a plasma media. In summary, the surface of wire 10 is rapidly heated to a high temperature to burn off and evaporate any accumulated impurities. By bringing the sheath to the cleaning device with an elevated temperature, there is a heat reservoir in the sheath to prevent mass quenching during the cleaning operation. This substantially increases the efficiency of the cleaning process. If this additional heating is required, a second cleaning device 200 is located downstream of cleaning 100. Indeed, in practice, three separate sequential heating devices are used to clean surface 70. In this manner, there is a substantial time during which surface 70 is above the evaporation or burn off temperature. After the cleaning operation, wire 10 is wrapped onto a reel or coiled into a drum, as schematically illustrated at location 210.

Figure 12:
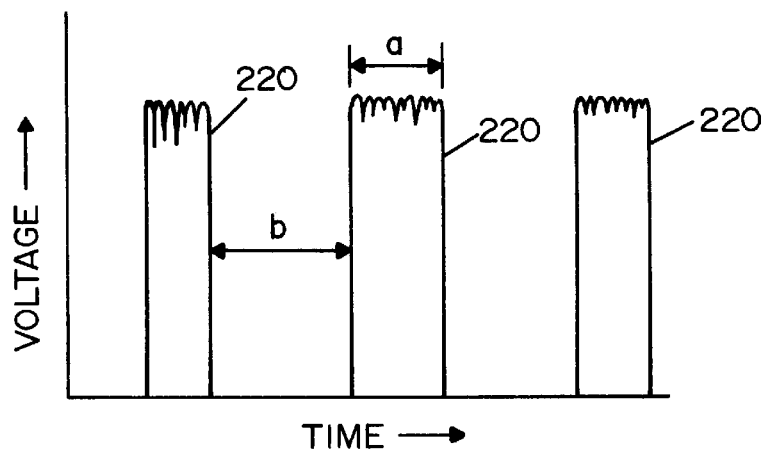
FIG. 12 is a graph showing an aspect of voltage pulsed in accordance with an embodiment of the present invention; and, FIG. 13 is a schematic view illustrating the use of induction heating in the second embodiment of the present invention.

Although high frequency from power supply 142 is an alternating current having a high current and voltage magnitude, in accordance with a modification of the invention, the cleaning voltage can be pulsed. This is shown in FIG. 12. High frequency pulses 220 have a width b and a spacing a. During the duration of pulses 220, arcing occurs across gap 104. Between the voltage pulses, arcing is discontinued so that the temperature stabilizes on the surface of wire 10. This causes variations in the location of arcs to better distribute the heating caused by resistance heating and plasma heating.

Figure 13:
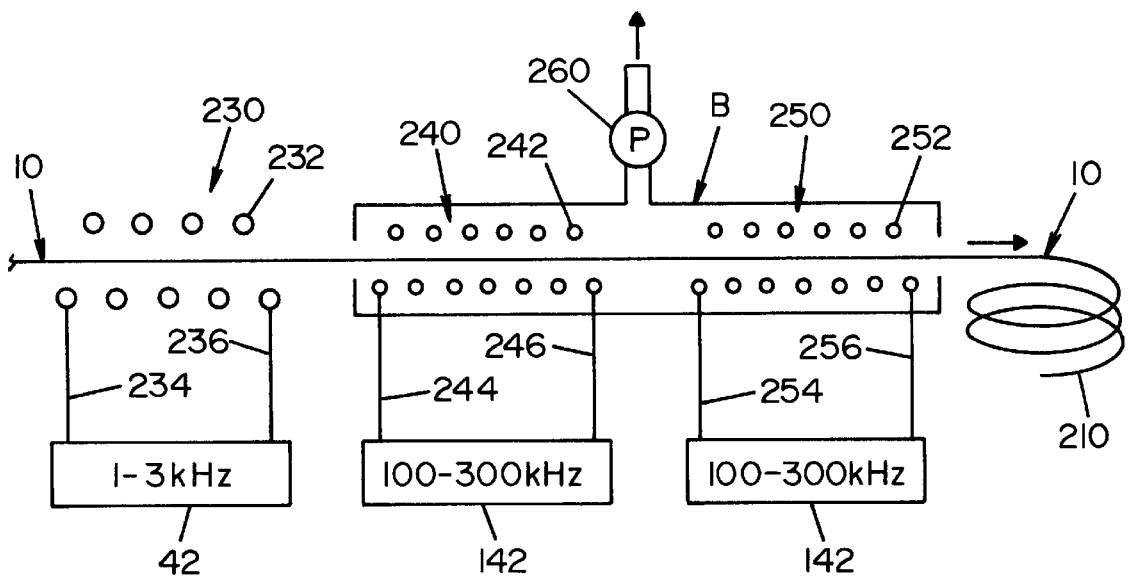

Referring now to FIG. 13, wire 10 is annealed and cleaned by an induction heating procedure. Two frequencies are used to obtain the heating pattern shown in FIG. 8. In accordance with this embodiment of the invention, annealing station 230 includes an induction heating coil 232 defining the outer tube or tunnel of the annealing station. Power supply 42 is connected by leads 234, 236 across coil 232 causing an alternating current to flow in sheath 12. As wire 10 passes though coil 232, it is induction heated to a reference depth determined by the frequency of power supply 42 which, in practice, is 1–3 kHz. This gives a relatively deep reference depth in sheath 12. The heated sheath then cools gradually in air and passes to the cleaning device 240. An induction heating coil 242 is connected by leads 244, 246 with power supply 142. Since this power supply has a high frequency, the reference depth is very small. This provides the heating pattern shown in FIG. 8. To conform with the preferred embodiment of the invention, a subsequent heating device 250 is illustrated as including induction heating coil 252 driven by power supply 142 through leads 254, 256. Second cleaning device 250 is accumulative and provides a longer time at high temperatures for surface 70. In another embodiment, the induction heating station shown in FIG. 13 is used in manufacturing line A as shown in FIG. 1. Annealing station 40 uses induction heating as shown at station 230. Indeed, the preferred implementation of the present invention is the use of induction heating for the annealing station. By using the induction heating cleaning device 230, heat profile 50 can be better controlled. Thereafter, the induction heating versions of the cleaning devices 240, 250 replace one or more of the heating devices as shown in FIG. 1. Various combinations of the two types of heating devices can be used in practice in the present invention. In practice, a chamber B encapsulates heating stations 240, 250. A pump 260 creates a vacuum in chamber B to give a reduced partial pressure to facilitate evaporation from heated surface 70.

Having thus defined the invention, the following is claimed:

1. A wire cleaner for removing impurities from the surface of an elongated welding wire as the welding wire travels along a given path, said wire cleaner comprising a first tunnel with a first tube having a central passage with an inner surface at least partially surrounding said path with a gap between said inner surface of said first tube and said wire moving through said first tube, a power supply with first and second output terminals across which is generated an first output current having an AC frequency in the range of about 100–300 kHz and a magnitude of at least about one ampere, a first contact electrically connecting said first output terminal to said first tube and a second contact electrically connecting said second output terminal to said welding wire as said welding wire travels along said given path, said current through said welding wire being proportional to said output current flows along said surface of said welding wire and across said gap between said welding wire and said inner surface of said first tube to heat said welding wire to cause evaporation of said surface impurities by resistance and plasma cleaning.

2. The wire cleaner as defined in claim 1, including a gap inlet into said first tube to direct inert gas into said first tube.

3. The wire cleaner as defined in claim 2, wherein said second contact includes a ring at least partially surrounding said welding wire, said ring having an opening for said welding wire to slidably contact at least a portion of said ring.

4. The wire cleaner as defined in claim 3, including a second tunnel downstream of said first tunnel, said second tunnel with a second tube having an inner surface at least partially surrounding said moving welding wire, a second power supply generating a second output current having a frequency in the range of about 100–300 kHz and a magnitude of at least about one ampere to heat said moving welding wire to evaporate said impurities on said surface of said welding wire.

5. The wire cleaner as defined in claim 4, wherein said moving welding wire is heated in said second tunnel by a heater selected from the group consisting of a resistance heater, a plasma heater, an induction heater, and combinations thereof.

6. The wire cleaner as defined in claim 5, wherein said moving welding wire is heated in said second tunnel by an induction heater.

7. The wire cleaner as defined in claim 6, including an annealing station upstream of said first tunnel, said annealing station including a low frequency heater to heat said surface of said moving wire to an annealing temperature.

8. The wire cleaner as defined in claim 7, wherein said low frequency heater includes a heater selected from the group consisting of a resistance heater, an induction heater, and combinations thereof.

9. The wire cleaner as defined in claim 5, wherein said moving welding wire is heated in said second tunnel by a resistance heater.

10. The wire cleaner as defined in claim 9, including an annealing station upstream of said first tunnel, said annealing station including a low frequency heater to heat said surface of said moving wire to an annealing temperature.

11. The wire cleaner as defined in claim 10, wherein said low frequency heater includes a heater selected from the group consisting of a resistance heater, an induction heater, and combinations thereof.

12. The wire cleaner as defined in claim 2, including an annealing station upstream of said first tunnel, said annealing station including a low frequency heater to heat said surface of said moving wire to an annealing temperature.

13. The wire cleaner as defined in claim 12, wherein said low frequency heater includes a heater selected from the group consisting of a resistance heater, an induction heater, and combinations thereof.

14. The wire cleaner as defined in claim 1, wherein said second contact includes a ring at least partially surrounding said welding wire, said ring having an opening for said welding wire to slidably contact at least a portion of said ring.

15. The wire cleaner as defined in claim 14, including an annealing station upstream of said first tunnel, said annealing station including a low frequency heater to heat said surface of said moving wire to an annealing temperature.

16. The wire cleaner as defined in claim 15, wherein said low frequency heater includes a heater selected from the group consisting of a resistance heater, an induction heater, and combinations thereof.

17. The wire cleaner as defined in claim 1, including a second tunnel downstream of said first tunnel, said second tunnel with a second tube having an inner surface at least partially surrounding said moving welding wire, a second power supply generating a second output current having a frequency in the range of about 100–300 kHz and a magnitude of at least about one ampere to heat said moving welding wire to evaporate said impurities on said surface of said welding wire.

18. The wire cleaner as defined in claim 17, wherein said moving welding wire is heated in said second tunnel by a heater selected from the group consisting of a resistance heater, a plasma heater, an induction heater, and combinations thereof.

19. The wire cleaner as defined in claim 18, wherein said moving welding wire is heated in said second tunnel by an induction heater.

20. The wire cleaner as defined in claim 19, including an annealing station upstream of said first tunnel, said annealing station including a low frequency heater to heat said surface of said moving wire to an annealing temperature.

21. The wire cleaner as defined in claim 18, wherein said moving welding wire is heated in said second tunnel by a resistance heater.

22. The wire cleaner as defined in claim 21, including an annealing station upstream of said first tunnel, said annealing station including a low frequency heater to heat said surface of said moving wire to an annealing temperature.

23. The wire cleaner as defined in claim 17, including an annealing station upstream of said first tunnel, said annealing station including a low frequency heater to heat said surface of said moving wire to an annealing temperature.

24. The wire cleaner as defined in claim 1, including an annealing station upstream of said first tunnel, said annealing station including a low frequency heater to heat said surface of said moving wire to an annealing temperature.

25. The wire cleaner as defined in claim 24, wherein said low frequency heater includes a heater selected from the group consisting of a resistance heater, an induction heater, and combinations thereof.

26. A wire cleaner for removing impurities from the surface of an elongated welding wire as the wire travels along a given path, said wire cleaner comprising a plurality of induction heating coils with a central passage surrounding said path with said wire moving through said central passage, at least one power supply for said plurality of induction coils generating an AC output current having a frequency in the range of about 100–300 kHz and a magnitude of at least about 1.0 amperes, and terminals for attaching said power supply across said plurality of induction heating coils whereby said current in said induction heating coils induces a voltage causing current flow in said surface of said wire to a reference depth corresponding to said frequency.

27. The wire cleaner as defined in claim 26, wherein each of said induction coils is powered by a separate power supply.

28. The wire cleaner as defined in claim 26, including a wire preheater to heat said wire prior to said wire being heated by said induction heating coils.

29. The wire cleaner as defined in claim 28, wherein said wire preheater includes an induction coil and a power supply having a frequency in the range of about 1–3 kHz.

30. The wire cleaner as defined in claim 29, wherein said passageway includes inert gases.

31. The wire cleaner as defined in claim 26, wherein said passageway includes inert gases.

32. A method of removing impurities from the surface of an elongated welding wire as the wire travels along a given path, said method comprising:
(a) initially heating said wire at a first location along said path to a first depth;
(b) subsequently heating the surface of said heated moving wire at a second location after said first location to a second depth less than said first depth with an AC current having a frequency in the range of about 100–300 kHz and a magnitude of at least about 1.0 amperes to remove said impurities.

33. The method as defined in claim 32, wherein said initial heating is at least partially by a drawing die.

34. The method as defined in claims 33, wherein said subsequent heating is at least partially by induction heating.

35. The method as defined in claim 34, wherein said welding wire is a cored wire.

36. The method as defined in claim 34, including creation of an atmosphere of inert gas around said wire during subsequent heating.

37. The method as defined in claim 34, wherein said subsequent heating is in a chamber of reduced atmospheric pressure.

38. The method as defined in claim 33, wherein said subsequent heating is at least partially by resistance heating.

39. The method as defined in claim 33, wherein said subsequent heating is at least partially plasma heating.

40. The method as defined in claim 32, wherein said initial heating is at least partially by induction heating.

41. The method as defined in claim 40, wherein said subsequent heating is at least partially by induction heating.

42. The method as defined in claim 41, wherein said welding wire is a cored wire.

43. The method as defined in claim 41, including creation of an atmosphere of inert gas around said wire during subsequent heating.

44. The method as defined in claim 41, wherein said subsequent heating is in a chamber of reduced atmospheric pressure.

45. The method as defined in claim 40, wherein said subsequent heating is at least partially by resistance heating.

46. The method as defined in claim 40, wherein said subsequent heating is at least partially plasma heating.

47. The method as defined in claim 32, wherein said initial heating is at least partially by resistance heating.

48. The method as defined in claim 47, wherein said subsequent heating is at least partially by induction heating.

49. The method as defined in claim 48, wherein said welding wire is a cored wire.

50. The method as defined in claim 48, including creation of an atmosphere of inert gas around said wire during subsequent heating.

51. The method as defined in claim 48, wherein said subsequent heating is in a chamber of reduced atmospheric pressure.

52. The method as defined in claim 47, wherein said subsequent heating is at least partially by resistance heating.

53. The method as defined in claim 47, wherein said subsequent heating is at least partially plasma heating.

54. By The method as defined in claim 32, wherein said subsequent heating is at least partially by induction heating.

55. The method as defined in claim 32, wherein said subsequent heating is at least partially by resistance heating.

56. The method as defined in claim 32, wherein said subsequent heating is at least partially plasma heating.

57. The method as defined in claim 32, wherein said welding wire is a cored wire.

58. The method as defined in claim 32, including creation of an atmosphere of inert gas around said wire during subsequent heating.

59. The method as defined in claim 32, wherein said subsequent heating is in a chamber of reduced atmospheric pressure.

* * * * *